UNITED STATES PATENT OFFICE 1,989,469

1(NITRO PHENYL)-NITRO OR HALO-MER-CAPTOBENZOTHIAZOLES

Jan Teppema, Akron, Ohio, assignor to Wingfoot Corporation, Wilmington, Del., a corporation of Delaware No Drawing. Application February 6, 1929, Serial No. 338,050

14 Claims. (Cl. 260—44)

My invention relates to a new class of chemical compounds; more particularly, to certain mercaptothiazole derivatives not heretofore known to the art. One of the objects of my invention is to provide a new class of compounds which are particularly suitable for use as accelerators of vulcanization, as "promoters" in the froth flotation of ores, and as corrosion inhibitors in pickling baths for iron and steel articles, and for various other commercial purposes. Another of the objects of the invention is to provide a novel and economical method of preparing compounds of the kind above mentioned.

My invention involves, among other things, the discovery of a new class of nitro benzene derivatives of the thiazoles and a commercial method of preparing them. The compound 2,4 di-nitro phenyl mercaptobenzothiazole,

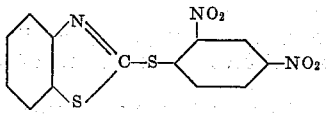

is a particular example of such material. In its preparation, the sodium salt of mercaptobenzothiazole,

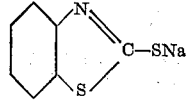

is dissolved, together with an equimolar quantity of 2,4 di-nitro chlor benzene, in alcohol or other suitable inert solvent. The quantity of solvent employed is relatively unimportant, but a sufficient amount should be used to insure complete solution. Reaction takes place between the mercaptobenzothiazole and the 2,4 di-nitro chlor benzene upon heating the solution to the boiling point at atmospheric pressures. Upon allowing the solution to stand and cool, the reaction product (2,4 di-nitro phenyl mercaptobenzothiazole) is precipitated as a crystalline material having, when pure, a melting point of 162° C.

Analogous reaction products may be prepared by the method employed in the preparation of the compound just discussed. A few of the materials which may be so prepared are 2,4 di-nitro phenyl 4-nitro mercaptobenzothiazole having the formula

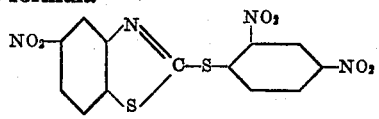

and having a melting point of 185° to 187° C.; 2,4 di-nitro phenyl 5-chlor mercaptobenzothiazole having the formula

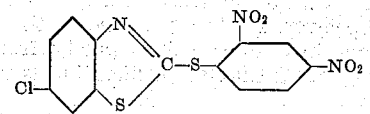

which has a melting point of 165° C.; 2,4 di-nitrophenyl 4-nitro 5-chlor benzothiazole having the formula

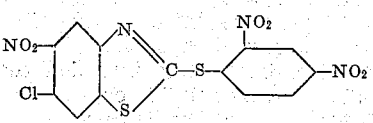

the melting point of which is 172° C. Obviously, alkyl substituted mercaptobenzothiazoles may be employed in lieu of the chlor- and nitro-substituted thiazoles of the above formulæ. Examples of such thiazoles are the methyl and dimethyl substituted mercaptobenzothiazole prepared from toluidine and xylidene by causing them to react, under heat and pressure in an autoclave, with sulfur and carbon bisulfide.

The mono nitro chlor benzenes likewise will react with the sodium salt of mercaptobenzothiazole and with the sodium salts of most, if not all, of the ordinary derivatives thereof. The formula of the 2-nitro chlor benzene derivatives of mercaptobenzothiazole (2-nitro phenyl mercaptobenzothiazole) may be represented by the following formula:

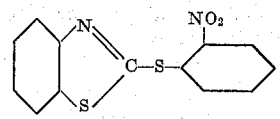

This compound melts at 110 to 112° C. other examples are the 2-nitro phenyl chlor mercaptobenzothiazoles, the 2-nitro phenyl nitro mercaptobenzothiazoles, nitro phenyl chlor the 2-nitro mercaptobenzothiazoles, and the 2-nitro phenyl methyl mercaptobenzothiazoles. The reaction between the mercaptobenzothiazole compounds and the mono nitro chlor benzenes is usually somewhat slower than that between the corresponding thiazoles and 2,4 di-nitro chlor benzene. For that reason, it is preferable to conduct the reaction in an autoclave under heat and pressure. A temperature of approximately 150° to 200° C. will in general be found sufficient to produce satisfactory results.

Still other materials may be prepared by employing 2-nitro chlor benzene compounds containing methyl, chlor, sulfonic, nitro or other groups in positions 3 or 5.

Mono-nitro phenyl derivatives of mercaptothiazoles, whether or not containing methyl, chlor, sulfonic or other substituent groups in positions 3 or 5, may as a rule be purified by recrystallization from alcohol, in which they are usually readily soluble. On the other hand, the 2, 4 dinitro compounds; e. g., 2, 4 di-nitro phenyl mercaptobenzothiazole, are only sparingly soluble in that material. Accordingly, it is preferable to employ aniline or toluene as solvents in their purification. Other solvents may, however, be used if desired.

All of the reactions described take place with comparative readiness and no expensive or complicated apparatus is necessary in connection therewith. The compounds in question are obtained in large and, in many cases, substantially quantitative yields. The reaction products are also comparatively pure and may be reduced to practical purity by the simple process of recrystallization from any of the solvents above mentioned. However, for many purposes the products are obtained in sufficient purity from the mother liquor and further purification is unnecessary.

Although I have described in detail only the preferred embodiments of the invention, it will be apparent to those skilled in the art that it is not limited thereto, but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A nitro phenyl chlor benzothiazyl sulphide.
2. A di-nitro phenyl nitro benzothiazyl sulphide.
3. A di-nitro phenyl nitro chlor benzothiazyl sulphide.
4. A nitro phenyl nitro benzothiazyl sulphide.
5. A nitro phenyl nitro chlor benzothiazyl sulphide.
6. A dinitro phenyl chlor benzothiazyl sulphide.
7. A compound having the formula

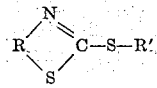

wherein R and R' are nitro substituted hydrocarbons of the benzene series.

8. A compound having the formula

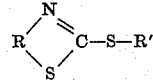

wherein R and R' are nitro substituted hydrocarbons of the benzene series, one of which includes two nitro groups.

9. A compound having the formula

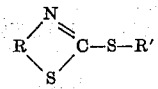

wherein R and R' are respectively mono- and di-nitro substituted hydrocarbons of the benzene series.

10. A compound having the formula

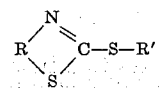

wherein R and R' are respectively chlor- and nitro- substituted hydrocarbons of the benzene series.

11. A compound having the formula

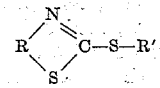

wherein R and R' are respectively chlor- and di-nitro- substituted hydrocarbons of the benzene series.

12. A compound having the formula

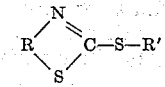

wherein R and R' are respectively nitro chlor- and nitro- substituted hydrocarbons of the benzene series.

13. A compound having the formula

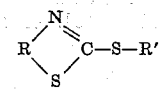

wherein R and R' are respectively nitro chlor- and dinitro- substituted hydrocarbons of the benzene series.

14. Thiazyl compounds of the group consisting of the nitro phenyl nitro benzothiazyl sulphides and the nitro phenyl halo-benzothiazyl sulphides.

JAN TEPPEMA.